April 6, 1965 K. P. LOVDAHL 3,176,334
COLLAPSIBLE RAMP AND STAIR UNITS
Filed Aug. 28, 1961
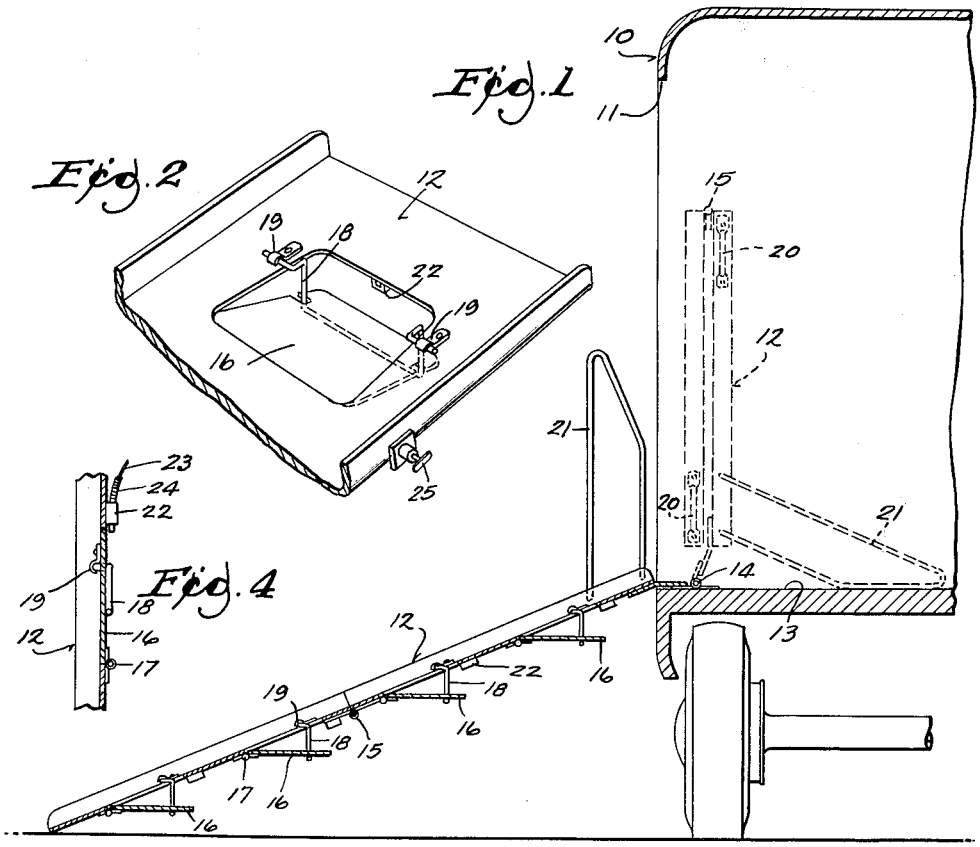
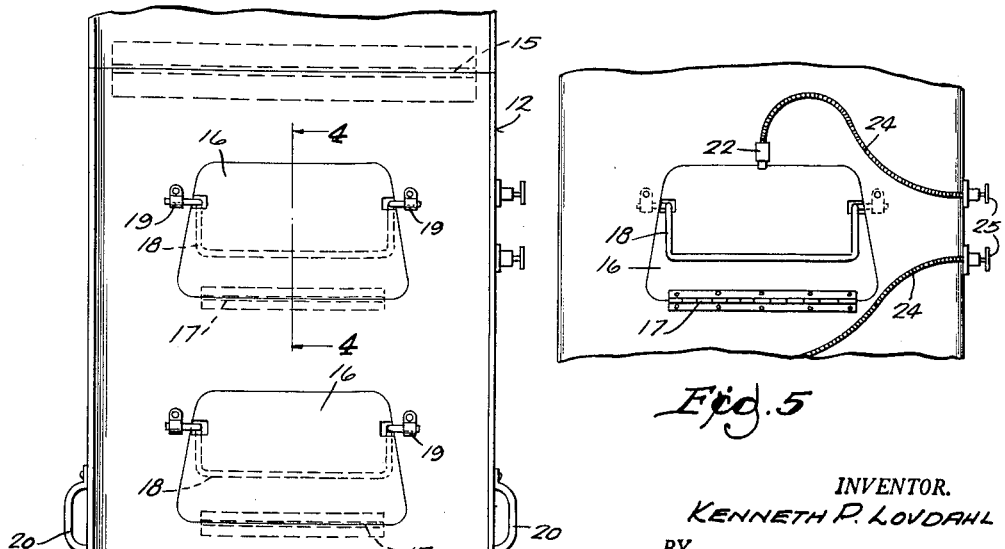
INVENTOR.
KENNETH P. LOVDAHL
BY
Gerald P. Welch
ATTORNEY

United States Patent Office 3,176,334
Patented Apr. 6, 1965

3,176,334
COLLAPSIBLE RAMP AND STAIR UNITS
Kenneth P. Lovdahl, P.O. Box 592, Mundelein, Ill.
Filed Aug. 28, 1961, Ser. No. 134,274
2 Claims. (Cl. 14—71)

This invention relates to improvements in collapsible ramp and stair units, and more particularly to a novel ramp and stair unit adapted for use with a vehicle for the transportation of handicapped persons.

An object of the invention is to provide a device of the type which is hinged to the floor of a vehicle at a door thereof, and which is hinged centrally against itself for compact folding.

Other and further objects of the invention will appear as the description proceeds, reference being had to the accompanying drawing, in which:

FIG. 1 is a view in vertical section of a vehicle with extended collapsible ramp and stair unit attached.

FIG. 2 is a fragmentary view in perspective from above.

FIG. 3 is a plan view of a portion of the ramp.

FIG. 4 is a sectional view taken on line 4—4 of FIG. 3.

FIG. 5 is a fragmentary inverted plan view of the ramp with step retracted.

Referring more particularly to the drawing, the numeral 10 refers to a vehicle having a side entrance as at 11. A collapsible ramp 12 is secured to the floor 13 of the vehicle 10 by means of the hinge 14 which is co-extensive with the width of the ramp 12, which also has a transverse central hinge 15.

A plurality of treads or steps 16 are frontally hinged as at 17 and are supported in use position by the formed wire brackets 18 pivotally mounted in the anchor members 19 on the upper surface of the ramp 12. Handles 20 are provided for convenience of the operator in extending or storing the ramp.

A rail 21 is provided at the top of the ramp 12 and serves to stabilize the assembly in stored position and as a hand rail when the ramp is in use position.

Each step 16 has an associated latch 22 for retaining said step in flush position on the ramp 12. A wire 23 within a flexible tube 24 connects each latch 22 with a handle 25.

In the stored position, the ramp is folded against itself and disposed vertically within the side doors of the vehicle. It is contemplated that the ramp may be used apart from a vehicle.

In use, the ramp may be used with the stairs flush as a horizontal or inclined ramp, or by releasing the latch means, the steps may be dropped into use position.

It will be understood that the device is capable of many modifications in structure and design, without departing from the spirit of the invention, within the scope of the appended claims.

Having thus described the invention, what is claimed and desired to be secured by Letters Patent of the United States, is:

1. A folding ramp having a hinge at one end adapted to be secured to a vehicle, said ramp comprising a plurality of transversely hinged segments having parallel upstanding flanges along the outer edges thereof to prevent passage thereover of the wheels of a vehicle, said segments having a hinged tread element cut out of the center thereof and supported at its hinge-free end by a U-shaped rod bracket fastened to the segment, said bracket being adapted to retain the tread in a stair-like position, said tread cut-out being of narrower gage than that of the ramp between flanges to provide for trackways between the cut-out and the upstanding flanges, latch means for retaining said treads flush with the ramp segments, and manual pullwire means connected to said latch means for releasal thereof.

2. A folding ramp having a hinge at one end adapted to be secured to a vehicle, said ramp comprising a plurality of transversely hinged segments having parallel upstanding flanges along the outer edges thereof to prevent passage thereover of the wheels of a vehicle, said segments having a hinged tread element cut out of the center thereof and supported at its hinge-free end by a U-shaped rod bracket fastened to the segment, said bracket being adapted to retain the tread in a stair-like position, said tread cut-out being of narrower gage than that of the ramp between flanges to provide for trackways between the cut-out and the upstanding flanges, latch means for retaining said treads flush with the ramp segments, manual pullwire means connected to said latch means for releasal thereof, and a looped vertical rail secured adjacent the hinged vehicle end of the ramp for manually rotating said ramp about said hinged vehicle end whereby said ramp may be folded and withdrawn into said vehicle and supported in said withdrawn position by the rail when engaging a vehicle floor.

References Cited by the Examiner
UNITED STATES PATENTS

| 1,034,061 | 7/12 | Benedict | 14—71 |
| 1,343,094 | 6/20 | Sims | 14—71 X |
| 1,791,330 | 2/31 | Sprague | 182—21 |
| 2,531,263 | 11/50 | Fink et al. | 14—71 X |
| 2,886,228 | 5/59 | Susikari | 182—97 |

FOREIGN PATENTS 26,745  1906  Germany.

JACOB L. NACKENOFF, *Primary Examiner.*